(12) United States Patent
Shi et al.

(10) Patent No.: US 9,225,826 B2
(45) Date of Patent: Dec. 29, 2015

(54) METHOD, APPARATUS AND SYSTEM FOR COMPATIBILITY WITH VDSL2 LEGACY CUSTOMER PREMISES EQUIPMENT

(71) Applicant: Huawei Technologies Co., Ltd., Shenzhen, Guangdong (CN)

(72) Inventors: Cao Shi, Shenzhen (CN); Jie Lv, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/623,386

(22) Filed: Feb. 16, 2015

(65) Prior Publication Data

US 2015/0163350 A1 Jun. 11, 2015

Related U.S. Application Data

(63) Continuation of application No. PCT/CN2012/080801, filed on Aug. 30, 2012.

(51) Int. Cl.
*H04M 1/24* (2006.01)
*H04M 3/08* (2006.01)
(Continued)

(52) U.S. Cl.
CPC . *H04M 3/34* (2013.01); *H04B 3/32* (2013.01); *H04B 3/487* (2015.01); *H04M 11/062* (2013.01)

(58) Field of Classification Search
CPC ....... H04L 1/0001; H04L 1/11; H04L 5/1438; H04L 11/062; H04L 2025/03426; H04L 2025/03751; H04L 2025/03764; H04L 25/085; H04B 3/32

USPC ............... 379/1.04, 1.03, 9, 12, 15.01, 22.08, 379/27.01, 29.01, 29.08, 32.01, 406.1; 375/222, 224, 227, 228, 231
See application file for complete search history.

(56) References Cited

U.S. PATENT DOCUMENTS 8,483,369 B2 * 7/2013 Cioffi .................... H04L 5/1407
370/201
2005/0237954 A1 10/2005 Hasegawa et al.
(Continued)

FOREIGN PATENT DOCUMENTS

CN 101222242 A 7/2008
CN 102111186 A 6/2011
(Continued)

OTHER PUBLICATIONS

"Very high speed digital subscriber line transceivers 2 (VDSL2)", Recommendation ITU-T G.993.2 (2011)—Corrigendum 1, Jun. 2012, 22 pages.
(Continued)

*Primary Examiner* — Binh Tieu

(57) ABSTRACT

Embodiments of the present invention provide a method for compatibility with a VDSL2 legacy customer premises equipment, including: selecting tones in preset locations from tones of a legacy line as training tones; controlling the training tones not to transmit data and modulating a pilot sequence on the training tones; calculating and feeding back clipped errors on a Vectored line; and calculating coefficients, for the training tones, of crosstalk of the legacy line in the Vectored line according to the pilot sequence and the clipped errors. The embodiments of the present invention further provide an apparatus and a system for compatibility with a VDSL2 legacy customer premises equipment.

20 Claims, 6 Drawing Sheets

(51) Int. Cl.
*H04M 3/22* (2006.01)
*H04M 3/34* (2006.01)
*H04B 3/32* (2006.01)
*H04M 11/06* (2006.01)
*H04B 3/487* (2015.01)

(56) References Cited

U.S. PATENT DOCUMENTS

| | | | |
|---|---|---|---|
| 2009/0270038 A1* | 10/2009 | Clausen | H04M 11/062 455/63.1 |
| 2009/0271550 A1* | 10/2009 | Clausen | H04L 25/085 710/269 |
| 2009/0310502 A1 | 12/2009 | Nuzman et al. | |
| 2010/0271263 A1 | 10/2010 | Moshfeghi | |
| 2011/0096870 A1* | 4/2011 | Schenk | H04B 3/32 375/296 |
| 2011/0110402 A1* | 5/2011 | Schenk | H04L 1/0001 375/219 |
| 2012/0207197 A1 | 8/2012 | Lv et al. | |
| 2014/0140187 A1 | 5/2014 | Wang et al. | |
| 2014/0369480 A1* | 12/2014 | Cioffi | H04L 5/1438 379/93.01 |
| 2015/0222326 A1* | 8/2015 | Cioffi | H04L 5/1438 370/201 |

FOREIGN PATENT DOCUMENTS

| | | |
|---|---|---|
| CN | 102388588 A | 3/2012 |
| WO | WO 2011/009593 A2 | 1/2011 |
| WO | WO 2012/106936 A1 | 8/2012 |

OTHER PUBLICATIONS

"Self-FEXT cancellation (vectoring) for use with VDSL2 transceivers", Recommendation ITU-T G.993.5 (2010)—Corrigendum 2, Jun. 2012, 7 pages.

* cited by examiner

METHOD, APPARATUS AND SYSTEM FOR COMPATIBILITY WITH VDSL2 LEGACY CUSTOMER PREMISES EQUIPMENT

CROSS-REFERENCE TO RELATED APPLICATIONS

This application is a continuation of International Application No. PCT/CN2012/080801, filed on Aug. 30, 2012, which is hereby incorporated by reference in its entirety.

TECHNICAL FIELD

The present invention relates to the communications field, and in particular, to a method, an apparatus and a system for compatibility with a VDSL2 legacy customer premises equipment.

BACKGROUND xDSL is a generic term for various types of digital subscriber lines (DSL), and is a high speed data transmission technology implemented by using unshielded twist pairs (UTP). An xDSL technology for passband transmission uses a frequency division multiplexing technology to enable an xDSL service and a plain old telephone service (POTS) to co-exist on a same twisted pair, where the xDSL service occupies a high frequency band, the POTS occupies a baseband part below 4 kHz, and POTS signals are separated from xDSL signals by a splitter. The xDSL technology for passband transmission uses discrete multi-tone (DMT) modulation. A system providing access for multiple xDSLs is called a digital subscriber line access multiplexer (DSLAM). According to an electromagnetic induction principle, interference, which is called crosstalk, is generated between multiple channels of signals that are received by the DSLAM. Energy of both near end crosstalk (NEXT) and far end crosstalk (FEXT) enhances with a rise in a frequency band. xDSL upstream and downstream channels use frequency division multiplexing, and the NEXT has a smaller impact on performance of a system. However, as the xDSL uses an increasingly wide frequency band, the FEXT affects line transmission performance more seriously. All systems for undistorted communication follow a famous Shannon's equation: $C=B\cdot(1+S/N)$, where C is channel capacity, B is a signal bandwidth, S is signal energy, and N is noise energy. In xDSL transmission, crosstalk is represented as part of noise, so serious FEXT significantly reduces a channel rate. When multiple users from a bundle of cables require provisioning of an xDSL service, the FEXT causes some lines to have low rates and unstable performance and even to encounter cases such as a failure to provision the service, and eventually leads to a low line activation ratio of the DSLAM. At present, the industry puts forward a vectored-DSL (Vectored-DSL) technology, which mainly makes use of possibility of performing coordinated reception and transmission at a DSLAM end to use a signal processing method to cancel interference of the FEXT. For downstream transmission, a pre-coder P is introduced at the DSLAM end to perform coordinated transmission of signals, and the signals are separately received at user ends; for upstream transmission, signals are separately transmitted at the user ends, and a crosstalk canceller W is introduced at the DSLAM end to perform coordinated reception of the signals to cancel crosstalk. In this process, synchronization is performed by using synchronization symbols (Sync Symbol). A vectoring control entity (VCE) uniformly allocates a pilot sequence to all lines, transceivers (transceiver) on the lines jointly modulate, on the sync symbols, the pilot sequence allocated by the VCE, and finally the VCE receives clipped errors fed back by a corresponding customer premises equipment (CPE) or CO-end transceiver, so that a downstream precoding matrix P' and an upstream cancellation matrix W' can be estimated in the VCE according to the pilot sequence and the clipped errors, and ultimately the FEXT is eliminated. Functions of the downstream precoding matrix P' and the upstream cancellation matrix W' are usually implemented in a canceller.

However, a second generation very-high-bit-rate digital subscriber loop (VDSL2) technology is earlier than the Vectored-DSL technology, and the VDSL2 technology has been widely used; therefore, compatibility with a VDSL2 legacy CPE that exists on a live network and does not support Vectored-DSL needs to be considered when VDSL2 is upgraded to the Vectored-DSL. However, the VDSL2 legacy CPE does not support transmission and reception of a pilot sequence or feedback of clipped errors on sync symbols; as a result, it is difficult for the VCE to estimate upstream and downstream cancellation matrixes that are used to cancel crosstalk coming from a legacy line to a Vectored line. When a vectored line in a data transmission time (Showtime) state exists in a system, as a Legacy line is added to the system, in a case in which crosstalk coming from the Legacy line is not canceled, error codes increase on the Vectored line in the Showtime state due to a decrease of a signal-to-noise ratio (SNR), which seriously affects a rate of the Vectored line and stability of an entire Vectored-DSL system.

In the prior art, all VDSL2 Legacy CPEs on a live VDSL2 network can be upgraded or changed to VDSL2 Vectored CPEs to solve problems of incompatibility between the VDSL2 Legacy CPEs and the VDSL2 Vectored CPEs and a failure to eliminate FEXT. However, upgrading all the Legacy CPEs on the live network needs to consume a lot of costs, and some earlier Legacy CPEs may fail to be upgraded to the Vectored CPEs due to various causes, for example, error calculation and error feedback are not supported, so that an entire CPE needs to be replaced, which further leads to an increase in costs.

SUMMARY

Embodiments of the present invention provide a method, an apparatus and a system for compatibility with a VDSL2 legacy customer premises equipment. Coefficients of crosstalk of a legacy line in a Vectored line can be obtained without increasing costs and changing an existing legacy customer premises equipment, and then the crosstalk of the legacy line in the Vectored line is eliminated and compatibility of a Vectored-DSL system with the legacy customer premises equipment is implemented.

A first aspect of the present invention provides a method for compatibility with a VDSL2 legacy customer premises equipment, which may include:

selecting tones in preset locations from tones of a legacy line as training tones;

controlling the training tones not to transmit data and modulating a pilot sequence on the training tones;

calculating and feeding back clipped errors on a Vectored line; and calculating coefficients, for the training tones, of crosstalk of the legacy line in the Vectored line according to the pilot sequence and the clipped errors.

In a first possible implementation manner, after the calculating coefficients, for the training tones, of crosstalk of the legacy line in the Vectored line according to the pilot sequence and the clipped errors, the method may further include:

extending the crosstalk coefficients to other non-training tones to obtain crosstalk coefficients of all the tones.

With reference to the first aspect or the first possible implementation manner of the first aspect, in a second possible implementation manner, a method for controlling the training tones not to transmit data may include:

modulating noise signals on the training tones; or
configuring virtual noise on the training tones; or
configuring tone blackouts on the training tones; or
skipping transmitting signals on the training tones during signal-to-noise ratio measurement.

With reference to the first aspect or the first or the second possible implementation manner of the first aspect, in a third possible implementation manner, a method for modulating the noise signals or the pilot sequence may include:

directly replacing to-be-transmitted signals X with desired signals E and controlling the desired signals E not to be superposed on cancellation signals ΔX backhauled by a canceller; or superposing to-be-transmitted signals X on cancellation signals ΔX to obtain desired signals E, where the desired signals E are the noise signals or the pilot sequence.

With reference to the third possible implementation manner of the first aspect, in a fourth possible implementation manner, a method for the superposing to-be-transmitted signals X on cancellation signals ΔX to obtain desired signals E may include:

when the to-be-transmitted signals X are directly replaced with the desired signals E and the desired signals E must be superposed on the cancellation signals ΔX, controlling, by the canceller, the backhauled cancellation signals ΔX to be equal to 0 or less than E/10; or performing calculation according to the desired signals E and the to-be-transmitted signals X to obtain the cancellation signals ΔX, where ΔX=E−X, and superposing the cancellation signals on the to-be-transmitted signals X to obtain the desired signals E, where finally transmitted signals are $\tilde{X}=X+\Delta X=X+E-X=E$.

With reference to the first aspect or the first or the second or the third or the fourth possible implementation manner of the first aspect, in a fifth possible implementation manner, a method for the extending the crosstalk coefficients to other non-training tones to obtain crosstalk coefficients of all the tones may include:

directly extending the crosstalk coefficients of the training tones to tones in preset intervals; or performing an interpolation operation on crosstalk coefficients of multiple training tones, and estimating crosstalk coefficients of other tones.

With reference to the first aspect or the first or the second or the third or the fourth or the fifth possible implementation manner of the first aspect, in a sixth possible implementation manner, the training tones may be a part or all of probe tones.

With reference to the first aspect or the first or the second or the third or the fourth or the fifth or the sixth possible implementation manner of the first aspect, in a seventh possible implementation manner, when the legacy line accesses the Vectored line for the first time, a method for performing initialization on the legacy line may include:

establishing a handshake relationship between the legacy line and the Vectored line;

modulating the pilot sequence on the legacy line and acquiring the clipped errors on the Vectored line, and calculating the coefficients of the crosstalk from the legacy line to the Vectored line; and performing a subsequent initialization operation and data transmission according to the acquired crosstalk coefficients.

A second aspect of the present invention provides an apparatus for compatibility with a VDSL2 legacy customer premises equipment, which may include:

a vectoring control entity, configured to select tones in preset locations from tones of a legacy line as training tones, and calculate coefficients, for the training tones, of crosstalk of the legacy line in a Vectored line according to a pilot sequence modulated on the training tones and clipped errors fed back by a vectored customer premises equipment; and a transceiver, configured to control the training tones not to transmit data and modulate the pilot sequence on the training tones.

In a first possible implementation manner, the vectoring control entity may further be configured to extend the crosstalk coefficients to other non-training tones to obtain crosstalk coefficients of all the tones.

With reference to the second aspect or the first possible implementation manner of the second aspect, in a second possible implementation manner, when controlling the training tones not to transmit data, the transceiver may further be configured to:

modulate noise signals on the training tones; or
configure virtual noise on the training tones; or
configure tone blackouts on the training tones; or
skip transmitting signals on the training tones during signal-to-noise ratio measurement.

With reference to the second aspect or the first or the second possible implementation manner of the second aspect, in a third possible implementation manner, the apparatus may further include a canceller, where the canceller may be configured to backhaul cancellation signals ΔX to the transceiver. When modulating the noise signals or the pilot sequence, the transceiver may further be configured to:

directly replace to-be-transmitted signals X with desired signals E and control the desired signals E not to be superposed on the cancellation signals ΔX backhauled by the canceller; or superpose to-be-transmitted signals X on the cancellation signals ΔX to obtain desired signals E, where the desired signals E are the noise signals or the pilot sequence.

With reference to the third possible implementation manner of the second aspect, in a fourth possible implementation manner, when the to-be-transmitted signals X are superposed on the cancellation signals ΔX to obtain the desired signals E, the canceller may further be configured to:

when the to-be-transmitted signals X are directly replaced with the desired signals E and the desired signals E must be superposed on the cancellation signals ΔX, control the backhauled cancellation signals ΔX to be equal to 0 or less than E/10; or perform calculation according to the desired signals E and the to-be-transmitted signals X to obtain the cancellation signals ΔX, where ΔX=E−X, and superpose the cancellation signals on the to-be-transmitted signals X to obtain the desired signals E, where finally transmitted signals are $\tilde{X}=X+\Delta X=X+E-X=E$.

With reference to the first or the second or the third or the fourth possible implementation manner of the second aspect, in a fifth possible implementation manner, when extending the crosstalk coefficients to other non-training tones to obtain the crosstalk coefficients of all the tones, the vectoring control entity may further be configured to:

directly extend the crosstalk coefficients of the training tones to tones in preset intervals; or perform an interpolation operation on crosstalk coefficients of multiple training tones, and estimate crosstalk coefficients of other tones.

With reference to the second aspect or the first or the second or the third or the fourth or the fifth possible implementation manner of the second aspect, in a sixth possible implementation manner, when the legacy line accesses the Vectored line for the first time and initialization is performed on the legacy line, the transceiver may further be configured to establish a handshake relationship between the legacy line and the Vectored line; the vectoring control entity may further be configured to modulate the pilot sequence on the legacy line, receive the clipped errors fed back by the vectored customer premises equipment, calculate the coefficients of the crosstalk from the legacy line to the Vectored line, and perform a subsequent initialization operation and data transmission according to the acquired crosstalk coefficients.

A third aspect of the present invention provides a system for compatibility with a VDSL2 legacy customer premises equipment, which may include:

a central office, a vectored customer premises equipment, a legacy customer premises equipment, at least one legacy line used to connect the central office and the legacy customer premises equipment, and at least one Vectored line used to connect the central office and the vectored customer premises equipment, where the central office is configured to select tones in preset locations from tones of the legacy line as training tones, control the training tones not to transmit data and modulate a pilot sequence on the training tones, and calculate coefficients, for the training tones, of crosstalk of the legacy line in the Vectored line according to the pilot sequence and clipped errors fed back by the vectored customer premises equipment; and the vectored customer premises equipment is configured to calculate and feed back the clipped errors on the Vectored line.

In a first possible implementation manner, the central office may further be configured to extend the crosstalk coefficients to other non-training tones to obtain crosstalk coefficients of all the tones.

With reference to the third aspect or the first possible implementation manner of the third aspect, in a second possible implementation manner, when controlling the training tones not to transmit data, the central office may further be configured to:

modulate noise signals on the training tones; or
configure virtual noise on the training tones; or
configure tone blackouts on the training tones; or
skip transmitting signals on the training tones during signal-to-noise ratio measurement.

With reference to the third aspect or the first or the second possible implementation manner of the third aspect, in a third possible implementation manner, the system may further include a canceller, where the canceller may be configured to backhaul cancellation signals $\Delta X$ to the central office. When modulating the noise signals or the pilot sequence, the central office may further be configured to:

directly replace to-be-transmitted signals X with desired signals E and control the desired signals E not to be superposed on the cancellation signals $\Delta X$ backhauled by the canceller; or superpose to-be-transmitted signals X on the cancellation signals $\Delta X$ to obtain desired signals E, where the desired signals E are the noise signals or the pilot sequence.

With reference to the third possible implementation manner of the third aspect, in a fourth possible implementation manner, when the to-be-transmitted signals X are superposed on the cancellation signals $\Delta X$ to obtain the desired signals E, the canceller may further be configured to:

when the to-be-transmitted signals X are directly replaced with the desired signals E and the desired signals E must be superposed on the cancellation signals $\Delta X$, control the backhauled cancellation signals $\Delta X$ to be equal to 0 or less than E/10; or perform calculation according to the desired signals E and the to-be-transmitted signals X to obtain the cancellation signals $\Delta X$, where $\Delta X = E - X$, and superpose the cancellation signals on the to-be-transmitted signals X to obtain the desired signals E, where finally transmitted signals are $\tilde{X} = X + \Delta X = X + E - X = E$.

With reference to the third or the fourth possible implementation manner of the third aspect, in a fifth possible implementation manner, the canceller may exist independently or be integrated into the central office.

With reference to the first or the second or the third or the fourth or the fifth possible implementation manner of the third aspect, in a sixth possible implementation manner, when extending the crosstalk coefficients to other non-training tones to obtain the crosstalk coefficients of all the tones, the central office may further be configured to:

directly extend the crosstalk coefficients of the training tones to adjacent tones; or perform an interpolation operation on crosstalk coefficients of multiple training tones, and estimate crosstalk coefficients of other tones.

With reference to the third aspect or the first or the second or the third or the fourth or the fifth or the sixth possible implementation manner of the third aspect, in a seventh possible implementation manner, when the legacy line accesses the Vectored line for the first time and initialization is performed on the legacy line, the central office may further be configured to:

establish a handshake relationship between the legacy line and the Vectored line;

modulate the pilot sequence on the legacy line and acquire the clipped errors on the Vectored line, and calculate the coefficients of the crosstalk from the legacy line to the Vectored line; and perform a subsequent initialization operation and data transmission according to the acquired crosstalk coefficients.

Implementing the embodiments of the present invention has the following beneficial effects:

Tones in preset locations are selected from tones of a legacy line as training tones, and the training tones are controlled not to transmit data, which implements possibility of modulating a pilot sequence on the training tones. A vectored customer premises equipment calculates and feeds back clipped errors, and then coefficients of crosstalk of the legacy line in a Vectored line can be calculated for the training tones according to the pilot sequence and the clipped errors, which implements obtaining of the coefficients of the crosstalk of the legacy line in the Vectored line without increasing costs and changing an existing legacy customer premises equipment, so that the crosstalk of the legacy line in the Vectored line is eliminated and compatibility of a Vectored-DSL system with the legacy customer premises equipment is implemented.

BRIEF DESCRIPTION OF THE DRAWINGS

To describe the technical solutions in the embodiments of the present invention or in the prior art more clearly, the following briefly introduces the accompanying drawings required for describing the embodiments or the prior art.

Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An existing Vectored-DSL technology mainly makes use of possibility of performing coordinated reception and transmission at a DSLAM end to use a signal processing method to cancel interference of FEXT and finally eliminate FEXT interference in each signal. An upstream and downstream shared channel H on the $k^{th}$ tone of a frequency domain may be represented in a matrix form:

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{M1} & h_{M2} & \ldots & h_{MM} \end{bmatrix}_{M \times M}$$

where $h_{ij}$ represents an equation of transmission from a line pair j to a line pair i. In an actual situation, i and j are equal and are equal to the number of lines in a Vectored-DSL system, which is set to M herein. Then H is an M×M channel transmission matrix. x is set to an M×1 channel input vector, y to an M×1 channel output vector, and n to an M×1 noise vector. Finally, a channel transmission equation is represented in the following form:

$$y = Hx + n$$

In an upstream signal transmission process, coordinated reception processing is performed on signals at a central office (CO) end, and one crosstalk canceller W is introduced at a receiving end, and then received signals are:

$$\tilde{y} = Wy = WHx + Wn$$

where when WH is a diagonal matrix, crosstalk is eliminated.

In a downstream signal transmission process, coordinated transmission processing is performed on signals at the CO end, and one pre-coder P is introduced at the CO end, and then transmitted signals are:

$$\tilde{x} = Px$$

and signals received at the receiving end are:

$$\tilde{y} = H\tilde{x} + n = HPx + n$$

where when HP is a diagonal matrix, crosstalk is eliminated.

To sum up, it can be learned that a key point of the Vectored-DSL technology is to estimate a downstream precoding matrix P and an upstream cancellation matrix W. Synchronization is performed by using sync symbols. A vectoring control entity (VCE) uniformly allocates a pilot sequence to all lines, transceivers on the lines modulate, on the sync symbols, the pilot sequence allocated by the VCE, and finally the VCE receives clipped errors fed back by a corresponding CPE or CO, so that the downstream precoding matrix P and the upstream cancellation matrix W can be estimated in the VCE according to the pilot sequence and the clipped errors, and ultimately FEXT is eliminated.

Figure 1:
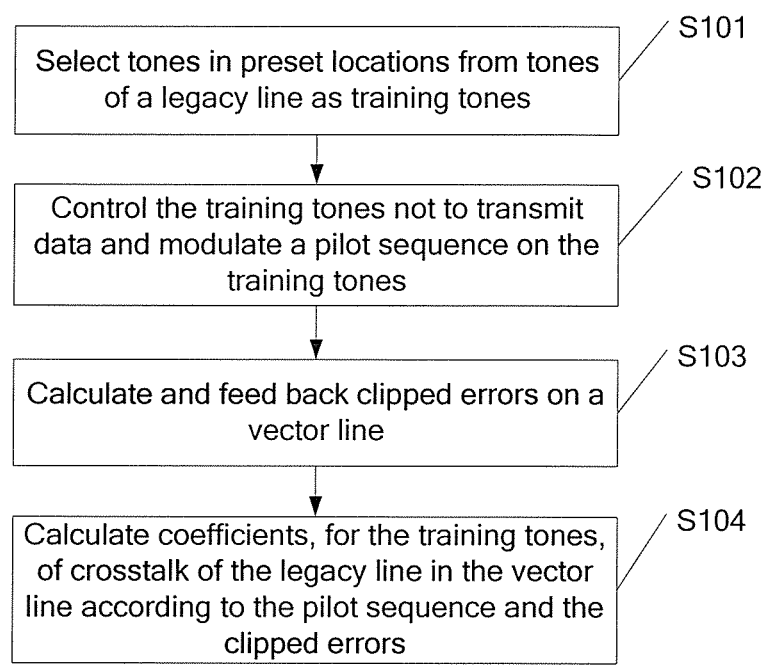
FIG. 1 is a schematic flowchart of a first embodiment of a method for compatibility with a VDSL2 legacy customer premises equipment according to the present invention.

FIG. 1 is a schematic flowchart of a first embodiment of a method for compatibility with a VDSL2 legacy customer premises equipment according to the present invention. In this embodiment, the method includes the following steps:

S101. Select tones in preset locations from tones of a legacy line as training tones, where the training tones are a part or all of probe tones.

S102. Control the training tones not to transmit data and modulate a pilot sequence on the training tones.

A premise for canceling crosstalk between the legacy line and a Vectored line is that all line symbols are synchronous and sync symbols are synchronous, and therefore it needs to be ensured that the legacy line and the Vectored line use a same symbol rate and have a same CE (cycle extension), so that symbol alignment can be implemented. This synchronization operation is implemented by a VCE and a transceiver, a related synchronization method is the same as an existing method for synchronization between Vectored lines.

To estimate a cancellation matrix of the crosstalk from the legacy line to the Vectored line, a pilot sequence, that is, vector training signals, needs to be transmitted on the legacy line. Because a legacy customer premises equipment cannot identify the pilot sequence, if the pilot sequence is forcibly transmitted on the legacy line, an unpredictable error will occur on the legacy customer premises equipment. Therefore, the method described in step S102 needs to be used to control the training tones not to transmit data.

Specifically, in this embodiment, a location sequence number of the training tones may be 4n+2, and the training tones are a part of probe tones, and certainly can also be set to all of the probe tones according to an application scenario. After location sequence numbers of the training tones are determined, the training tones are configured not to transmit data in a synchronization frame or a data frame. Therefore, a system may freely transmit and modulate the pilot sequence on these training tones without affecting stability of the legacy line; on non-training tones of the legacy line, data is sent properly according to an original specification, and the performance and stability are not affected. In addition, on the legacy line, a method for modulating the pilot sequence is the same as an existing method for modulating the pilot sequence on a Vectored line.

S103. Calculate and feed back clipped errors on a Vectored line.

Specifically, a vectored customer premises equipment compares a received signal with a desired signal at the Vectored line end, acquires the clipped errors by calculation, and feeds back the clipped errors to a vectoring control entity of a central office for processing, where the clipped errors include data of crosstalk of the legacy line in the Vectored line.

S104. Calculate coefficients, for the training tones, of crosstalk of the legacy line in the Vectored line according to the pilot sequence and the clipped errors.

The legacy line is a VDSL2 line connected, in a Vectored-DSL system, to a customer premises equipment that is a legacy customer premises equipment, and the Vectored line is a line supporting a vectoring standard and the G.993.5 protocol and is connected, in the Vectored-DSL system, to a customer premises equipment that is a vectored customer premises equipment. For a DSL legacy line and Vectored line, entities of both of them are the same, and only connected customer premises equipments are different.

According to the method in this embodiment, coefficients of crosstalk of a legacy line in a Vectored line can be obtained without increasing costs and changing an existing legacy customer premises equipment, and then the crosstalk of the legacy line in the Vectored line is eliminated, and compatibility of a Vectored-DSL system with the legacy customer premises equipment is implemented.

Figure 2:
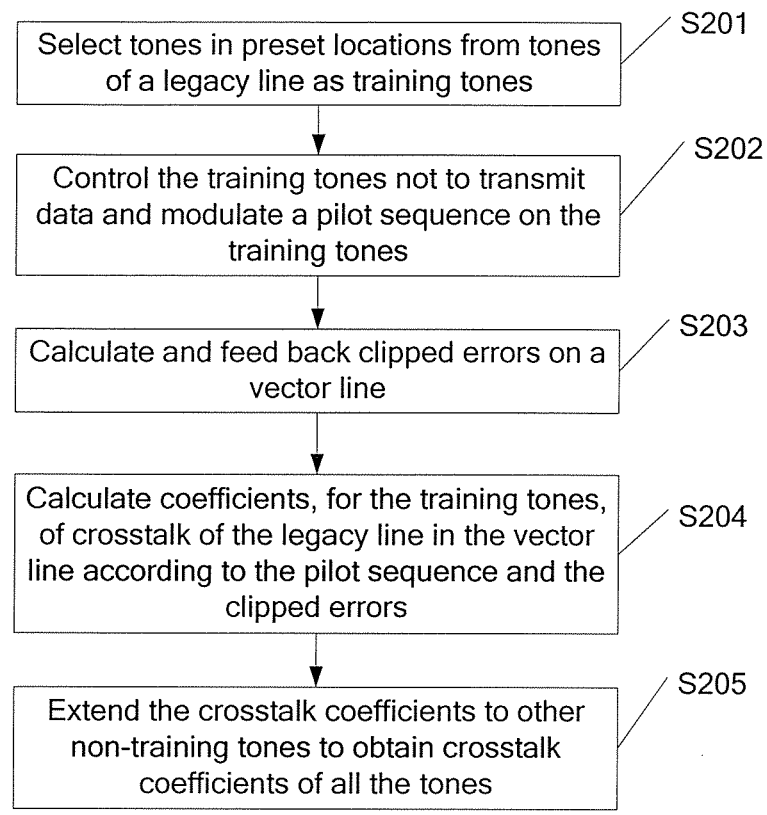
FIG. 2 is a schematic flowchart of a second embodiment of a method for compatibility with a VDSL2 legacy customer premises equipment according to the present invention.

FIG. 2 is a schematic flowchart of a second embodiment of a method for compatibility with a VDSL2 legacy customer premises equipment according to the present invention. In this embodiment, the method includes the following steps:

S201. Select tones in preset locations from tones of a legacy line as training tones, where the training tones are a part or all of probe tones.

S202. Control the training tones not to transmit data and modulate a pilot sequence on the training tones.

S203. Calculate and feed back clipped errors on a Vectored line.

S204. Calculate coefficients, for the training tones, of crosstalk of the legacy line in the Vectored line according to the pilot sequence and the clipped errors.

S205. Extend the crosstalk coefficients to other non-training tones to obtain crosstalk coefficients of all the tones.

Because variation of crosstalk coefficients with frequencies is continuous, a coefficient difference between tones in one interval is small. Therefore, the obtained crosstalk coefficients of the training tones may be extended to obtain the crosstalk coefficients of all the tones.

Specifically, an extension method may be direct assignment extension. For example, directly extending a crosstalk coefficient of a tone in a 4n+2 location to a tone in a 4n+1 or 4n+3 location, that is:

$P_{i,j}^{4n+1} = P_{i,j}^{4n+2}$; $P_{i,j}^{4n+3} = P_{i,j}^{4n+1}$, where $P_{i,j}^{4n+2}$ represents a coefficient, on the $(4n+2)^{th}$ tone, of crosstalk of the $j^{th}$ line in the $i^{th}$ Vectored line, and n is an integer. Similarly, crosstalk coefficients of tones in other locations may be obtained, and finally a precoding matrix is obtained, and the crosstalk of legacy line in the Vectored line may be eliminated by using a vectoring technology. The tone interval herein may be preset, which may be set to an interval with two adjacent tones, and may also be set to a larger one according to a scenario, such as an interval with 16 tones. Certainly, besides a direct extension method, crosstalk coefficients of other tones may also be estimated by performing an interpolation operation on crosstalk coefficients of multiple training tones. The simplest manner is linear interpolation.

In this embodiment, a method is provided for obtaining crosstalk coefficients of other tones according to crosstalk coefficients of training tones, so that a complete precoding matrix can be obtained, and ultimately crosstalk of a legacy line in a Vectored line is eliminated by using a vectoring technology.

Figure 3:
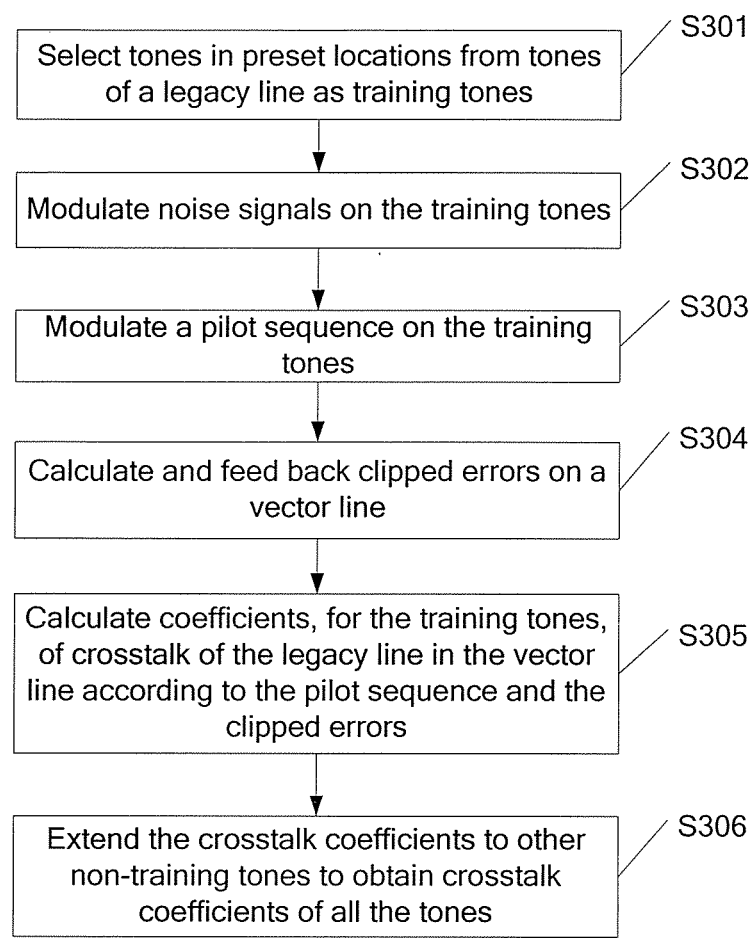
FIG. 3 is a schematic flowchart of a third embodiment of a method for compatibility with a VDSL2 legacy customer premises equipment according to the present invention.

FIG. 3 is a schematic flowchart of a third embodiment of a method for compatibility with a VDSL2 legacy customer premises equipment according to the present invention. In this embodiment, the method includes the following steps:

S301. Select tones in preset locations from tones of a legacy line as training tones, where the training tones are a part or all of probe tones.

S302. Modulate noise signals on the training tones.

Specifically, step S302 is one of methods for controlling the training tones not to transmit data. The noise signals are signals that cannot be identified by the legacy customer premises equipment, that is, signals that are different from signals defined by the G.993.2 standard. Because a pilot sequence itself is different from the signals defined by the G.993.2 standard, a simple special example of injecting noise signals is to modulate the pilot sequence on a data frame and/or a synchronization frame. The legacy customer premises equipment cannot identify signals on these tones when receiving signals; therefore, when measuring a signal-to-noise ratio, the legacy customer premises equipment may consider that noise is very large on these tones, and the measured signal-to-noise ratio is very low, so that the legacy customer premises equipment does not transmit data on these tones, and a system may freely modulate the pilot sequence on these tones without affecting stability of the legacy line.

Certainly, the training tones may also be configured not to transmit data in a manner of configuring virtual noise on the training tones or configuring tone blackouts on the training tones. Specifically, the virtual noise is noise that must be considered by the legacy customer premises equipment during data loading and is configured for the legacy customer premises equipment by a central office. When virtual noise with a higher amplitude is configured on some tones, the legacy customer premises equipment instructs the central office not to transmit data on these tones during initialization or data transmission time. In addition, it may also be that no signal is sent on corresponding training tones when the customer premises equipment measures a signal-to-noise ratio, so that the customer premises equipment obtains a very low signal-to-noise ratio and the customer premises equipment does not transmit data on these training tones.

S303. Modulate a pilot sequence on the training tones.

S304. Calculate and feed back clipped errors on a Vectored line.

S305. Calculate coefficients, for the training tones, of crosstalk of the legacy line in the Vectored line according to the pilot sequence and the clipped errors.

S306. Extend the crosstalk coefficients to other non-training tones to obtain crosstalk coefficients of all the tones.

In this embodiment, several methods for controlling training tones not to transmit data are provided to achieve a purpose of modulating a pilot sequence on a legacy line, and ultimately coefficients of crosstalk of the legacy line in a Vectored line are acquired.

Figure 4:
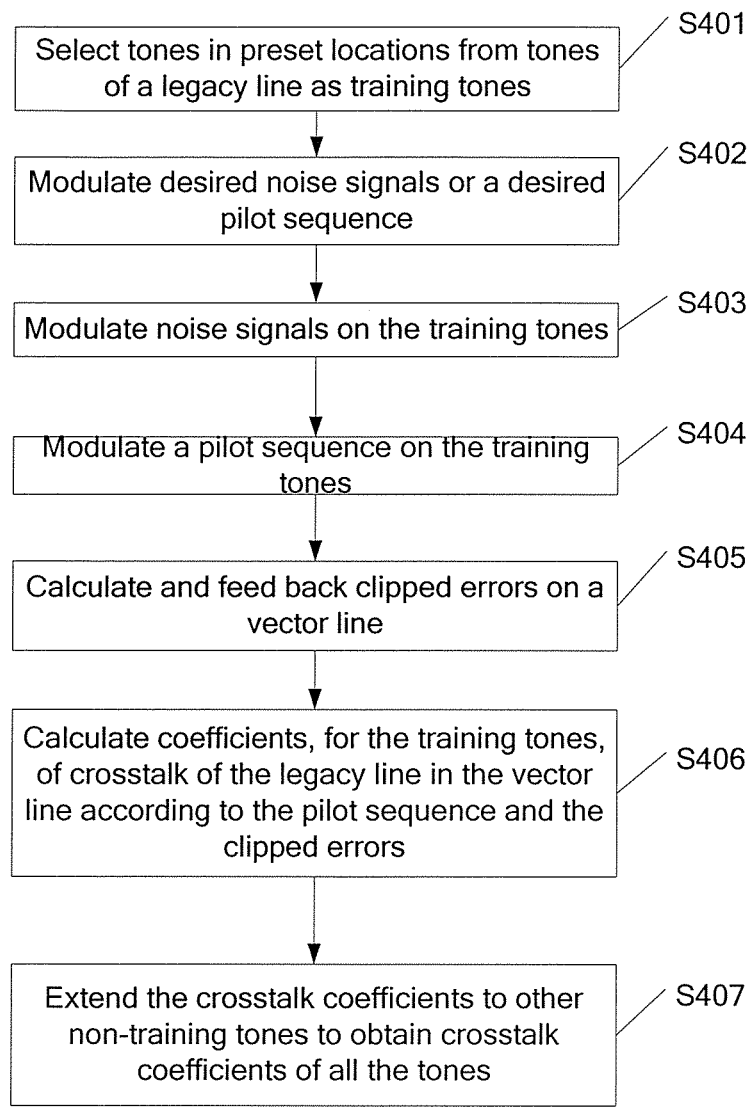
FIG. 4 is a schematic flowchart of a fourth embodiment of a method for compatibility with a VDSL2 legacy customer premises equipment according to the present invention.

FIG. 4 is a schematic flowchart of a fourth embodiment of a method for compatibility with a VDSL2 legacy customer premises equipment according to the present invention. In this embodiment, the method includes the following steps:

S401. Select tones in preset locations from tones of a legacy line as training tones, where the training tones are a part or all of probe tones.

S402. Modulate desired noise signals or a desired pilot sequence.

Specifically, a frequency domain signal vector X is set, representing to-be-transmitted signals of lines before precoding. The X is input to one canceller by a central office, is multiplied by a matrix (P−I), and then is superposed on its signals to obtain finally transmitted signals $\tilde{X}$, where P is a precoding matrix, and I is a unit matrix.

Implementation of the canceller may be represented as:

$$\tilde{X}=(P-I)\times X+I\times X=P\times X$$

In this way, the precoding process described in the background of this specification is implemented.

In this embodiment, to implement the precoding process described in the foregoing text, the noise signals and the pilot sequence used in a subsequent process need to be preprocessed to obtain desired signals. To-be-transmitted signals X may be directly replaced with desired signals E and the desired signals E may be controlled not to be superposed on cancellation signals ΔX backhauled by the canceller; or the to-be-transmitted signals X are superposed on the cancellation signals ΔX to obtain desired signals E, where the desired signals E are the noise signals or the pilot sequence.

Specifically, a method for superposing the to-be-transmitted signals X on the cancellation signals ΔX to obtain the desired signals E includes: when the to-be-transmitted signals X are directly replaced with the desired signals E and the desired signals E must be superposed on the cancellation signals ΔX, controlling, by the canceller, the backhauled cancellation signals ΔX to be equal to 0 or less than E/10; or performing calculation according to the desired signals E and the to-be-transmitted signals X to obtain the cancellation signals ΔX, where ΔX=E−X, and superposing the cancellation signals on the to-be-transmitted signals X to obtain the desired signals E, where finally transmitted signals are $$\tilde{X}=X+\Delta X=X+E-X=E.$$

S403. Modulate noise signals on the training tones.

Certainly, it may also be: configuring virtual noise on the training tones; or configuring tone blackouts on the training tones; or skipping transmitting signals on the training tones during signal-to-noise ratio measurement.

S404. Modulate a pilot sequence on the training tones.

S405. Calculate and feed back clipped errors on a Vectored line.

S406. Calculate coefficients, for the training tones, of crosstalk of the legacy line in the Vectored line according to the pilot sequence and the clipped errors.

S407. Extend the crosstalk coefficients to other non-training tones to obtain crosstalk coefficients of all the tones.

In this embodiment, a specific method is provided for modulating required noise signals or a required pilot sequence on a legacy line, a precoding function may be implemented by performing corresponding control at a central office or canceller end without a need to perform any change on a legacy customer premises equipment.

Figure 5:
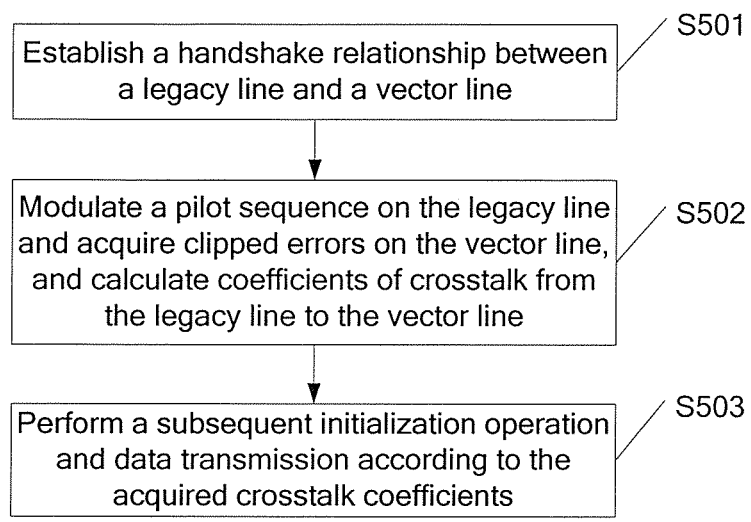
FIG. 5 is a flowchart, according to the present invention, for performing initialization on a legacy line when the legacy line accesses a Vectored line for the first time.

FIG. 5 is a flowchart, according to the present invention, for performing initialization on a legacy line when the legacy line accesses a Vectored line for the first time. The following steps are included:

S501. Establish a handshake relationship between the legacy line and the Vectored line.

S502. Modulate a pilot sequence on the legacy line and acquire clipped errors on the Vectored line, and calculate coefficients of crosstalk from the legacy line to the Vectored line.

S503. Perform a subsequent initialization operation and data transmission according to the acquired crosstalk coefficients.

In the prior art, an initialization process of a legacy line includes a handshake phase, a channel discovery phase, a channel training phase and a channel analysis and exchange phase. In this embodiment, one vector training phase is forcibly inserted, by using step S502, after a handshake phase in an original initialization process. Because the forcibly sent vector training phase cannot be identified by a legacy customer premises equipment, the first training may fail. However, by means of the vector training phase, the pilot sequence is sent on the legacy line and the clipped errors are acquired on the Vectored line, and the coefficients of the crosstalk from the legacy line to the Vectored line are calculated. In this way, the crosstalk from the legacy line to the Vectored line may be eliminated. During the second training, it is only required to perform training according to a normal training process for a legacy customer premises equipment by using the crosstalk coefficient obtained in the first training. The initialization process of the legacy line can be completed by means of such a twice-initialization method. Certainly, the method is also applicable to another scenario in which a legacy line is added to a system without a legacy line.

Figure 6:
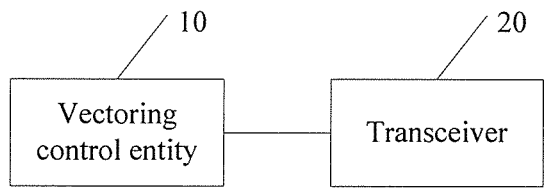
FIG. 6 is a schematic composition diagram of a first embodiment of an apparatus for compatibility with a VDSL2 legacy customer premises equipment according to the present invention.

FIG. 6 is a schematic composition diagram of a first embodiment of an apparatus for compatibility with a VDSL2 legacy customer premises equipment according to the present invention. In this embodiment, the apparatus includes: a vectoring control entity 10 and a transceiver 20.

The vectoring control entity 10 is configured to select tones in preset locations from tones of a legacy line as training tones, and calculate coefficients, for the training tones, of crosstalk of the legacy line in a Vectored line according to a pilot sequence modulated on the training tones and clipped errors fed back by a vectored customer premises equipment; the transceiver 20 is configured to control the training tones not to transmit data and modulate the pilot sequence on the training tones.

When controlling the training tones not to transmit data, the transceiver 20 is further configured to:

modulate noise signals on the training tones; or
configure virtual noise on the training tones; or
configure tone blackouts on the training tones; or
skip transmitting signals on the training tones during signal-to-noise ratio measurement.

The vectoring control entity 10 is further configured to extend the crosstalk coefficients to other non-training tones to obtain crosstalk coefficients of all the tones.

When extending the crosstalk coefficients to other non-training tones to obtain the crosstalk coefficients of all the tones, the vectoring control entity 10 is further configured to:

directly extend the crosstalk coefficients of the training tones to tones in preset intervals; or perform an interpolation operation on crosstalk coefficients of multiple training tones, and estimate crosstalk coefficients of other tones.

When the legacy line accesses the Vectored line for the first time and initialization is performed on the legacy line, the transceiver 20 is further configured to establish a handshake relationship between the legacy line and the Vectored line; the vectoring control entity 10 is further configured to modulate the pilot sequence on the legacy line, receive the clipped errors fed back by the vectored customer premises equipment, calculate the coefficients of the crosstalk from the legacy line to the Vectored line, and perform a subsequent initialization operation and data transmission according to the acquired crosstalk coefficients.

Figure 7:
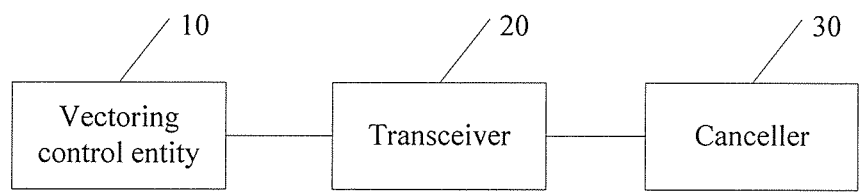
FIG. 7 is a schematic composition diagram of a second embodiment of an apparatus for compatibility with a VDSL2 legacy customer premises equipment according to the present invention.

FIG. 7 is a schematic composition diagram of a second embodiment of an apparatus for compatibility with a VDSL2 legacy customer premises equipment according to the present invention. In this embodiment, the apparatus includes: a vectoring control entity 10, a transceiver 20, and a canceller 30.

The canceller 30 is configured to backhaul cancellation signals $\Delta X$ to the transceiver 20. When modulating noise signals or a pilot sequence, the transceiver 20 is further configured to:

directly replace to-be-transmitted signals X with desired signals E and control the desired signals E not to be superposed on the cancellation signals $\Delta X$ backhauled by the canceller 30; or superpose to-be-transmitted signals X on the cancellation signals $\Delta X$ to obtain desired signals E, where the desired signals E are the noise signals or the pilot sequence.

When the to-be-transmitted signals X are superposed on the cancellation signals $\Delta X$ to obtain the desired signals E, the canceller 30 is further configured to:

when the to-be-transmitted signals X are directly replaced with the desired signals E and the desired signals E must be superposed on the cancellation signals $\Delta X$, control the backhauled cancellation signals $\Delta X$ to be equal to 0 or less than E/10; or perform calculation according to the desired signals E and the to-be-transmitted signals X to obtain the cancellation signals $\Delta X$, where $\Delta X = E - X$, and superpose the cancellation signals on the to-be-transmitted signals X to obtain the desired signals E, where finally transmitted signals are $$\tilde{X} = X + \Delta X = X + E - X = E.$$

Figure 8:
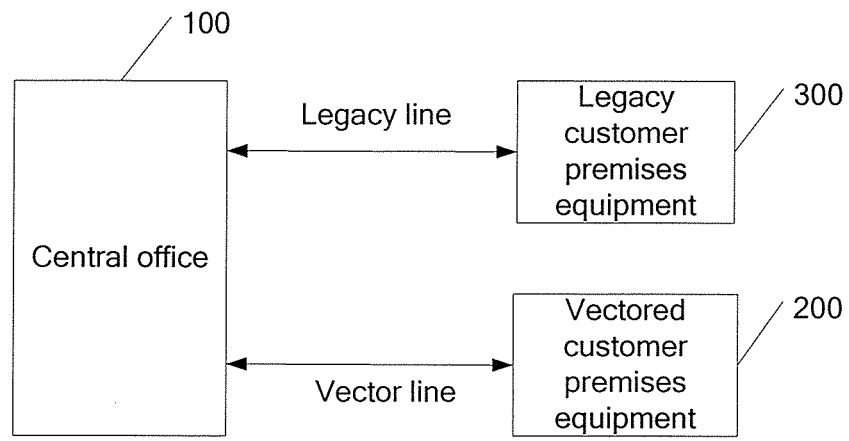
FIG. 8 is a schematic composition diagram of a first embodiment of a system for compatibility with a VDSL2 legacy customer premises equipment according to the present invention.

FIG. 8 is a schematic composition diagram of a first embodiment of a system for compatibility with a VDSL2 legacy customer premises equipment according to the present invention. In this embodiment, the system includes: a central office 100, a vectored customer premises equipment 200, a legacy customer premises equipment 300, at least one legacy line used to connect the central office 100 and the legacy customer premises equipment 300, and at least one Vectored line used to connect the central office 100 and the vectored customer premises equipment 200.

The central office 100 is configured to select tones in preset locations from tones of the legacy line as training tones, control the training tones not to transmit data and modulate a pilot sequence on the training tones, and calculate coefficients, for the training tones, of crosstalk of the legacy line in the Vectored line according to the pilot sequence and clipped errors fed back by the vectored customer premises equipment 200.

The vectored customer premises equipment 200 is configured to calculate and feed back the clipped errors on the Vectored line.

The central office 100 is further configured to extend the crosstalk coefficients to other non-training tones to obtain crosstalk coefficients of all the tones.

When extending the crosstalk coefficients to other non-training tones to obtain the crosstalk coefficients of all the tones, the central office 100 is further configured to:

directly extend the crosstalk coefficients of the training tones to adjacent tones; or perform an interpolation operation on crosstalk coefficients of multiple training tones, and estimate crosstalk coefficients of other tones, where the training tones are a part or all of probe tones.

When controlling the training tones not to transmit data, the central office 100 is further configured to:

modulate noise signals on the training tones; or configure virtual noise on the training tones; or configure tone blackouts on the training tones; or skip transmitting signals on the training tones during signal-to-noise ratio measurement.

When modulating the noise signals or the pilot sequence, the central office 100 is further configured to: directly replace to-be-transmitted signals X with desired signals E and control the desired signals E not to be superposed on cancellation signals $\Delta X$ backhauled by a canceller; or superpose to-be-transmitted signals X on cancellation signals $\Delta X$ to obtain desired signals E, where the desired signals E are the noise signals or the pilot sequence.

When the legacy line accesses the Vectored line for the first time and initialization is performed on the legacy line, the central office 100 is further configured to:

establish a handshake relationship between the legacy line and the Vectored line;

modulate the pilot sequence on the legacy line and acquire the clipped errors on the Vectored line, calculate the coefficients of the crosstalk from the legacy line to the Vectored line, and perform a subsequent initialization operation and data transmission according to the acquired crosstalk coefficients.

Figure 9:
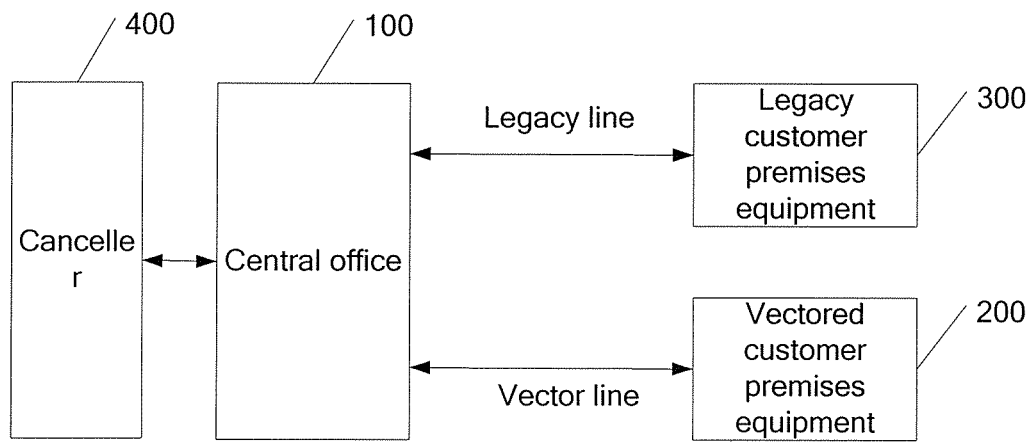
FIG. 9 is a schematic composition diagram of a second embodiment of a system for compatibility with a VDSL2 legacy customer premises equipment according to the present invention.

FIG. 9 is a schematic composition diagram of a second embodiment of a system for compatibility with a VDSL2 legacy customer premises equipment according to the present invention. In this embodiment, the system includes: a central office 100, a vectored customer premises equipment 200, a legacy customer premises equipment 300, at least one legacy line used to connect the central office 100 and the legacy customer premises equipment 300, at least one Vectored line used to connect the central office 100 and the vectored customer premises equipment 200, and a canceller 400.

The canceller 400 is configured to backhaul cancellation signals $\Delta X$ to the central office 100.

When to-be-transmitted signals X are superposed on the cancellation signals $\Delta X$ to obtain the desired signals E, the canceller is further configured to:

when the to-be-transmitted signals X are directly replaced with the desired signals E and the desired signals E must be superposed on the cancellation signals $\Delta X$, control the backhauled cancellation signals $\Delta X$ to be equal to 0 or less than E/10; or perform calculation according to the desired signals E and the to-be-transmitted signals X to obtain the cancellation signals $\Delta X$, where $\Delta X = E - X$, and superpose the cancellation signals on the to-be-transmitted signals X to obtain the desired signals E, where finally transmitted signals are $$\tilde{X} = X + \Delta X = X + E - X = E.$$

The canceller 400 exists independently or is integrated into the central office 100.

According to the description of the foregoing embodiments, the present invention has the following advantages:

Tones in preset locations are selected from tones of a legacy line as training tones, and the training tones are controlled not to transmit data, which implements possibility of modulating a pilot sequence on the training tones. A vectored customer premises equipment calculates and feeds back clipped errors, and then coefficients of crosstalk of the legacy line in a Vectored line can be calculated for the training tones according to the pilot sequence and the clipped errors, which implements obtaining of the coefficients of the crosstalk of the legacy line in the Vectored line without increasing costs and changing an existing legacy customer premises equipment, so that the crosstalk of the legacy line in the Vectored line is eliminated and compatibility of a Vectored-DSL system with the legacy customer premises equipment is implemented.

A person of ordinary skill in the art may understand that all or apart of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention. However, the protection scope of the present invention is not limited thereto. Therefore, equivalent variations made according to the claims of the present invention shall fall within the scope of the present invention.

What is claimed is:

1. A method for compatibility with a second generation very-high-bit-rate digital subscriber loop (VDSL2) legacy customer premises equipment, the method comprising:
    selecting tones in preset locations from tones of a legacy line as training tones;
    controlling the training tones not to transmit data and modulating a pilot sequence on the training tones;
    calculating and feeding back clipped errors on a Vectored line; and
    calculating coefficients, for the training tones, of crosstalk of the legacy line in the Vectored line according to the pilot sequence and the clipped errors.

2. The method according to claim 1, after calculating coefficients, for the training tones, of crosstalk of the legacy line in the Vectored line according to the pilot sequence and the clipped errors, the method further comprises:
    extending the crosstalk coefficients to other non-training tones to obtain crosstalk coefficients of all the tones.

3. The method according to claim 1, wherein controlling the training tones not to transmit data comprises:
    modulating noise signals on the training tones; or
    configuring virtual noise on the training tones; or
    configuring tone blackouts on the training tones; or
    skipping transmitting signals on the training tones during signal-to-noise ratio measurement.

4. The method according to claim 1, wherein modulating the noise signals or the pilot sequence comprises:
    directly replacing to-be-transmitted signals X with desired signals E and controlling the desired signals E not to be superposed on cancellation signals $\Delta X$ backhauled by a canceller; or
    superposing to-be-transmitted signals X on cancellation signals $\Delta X$ to obtain desired signals E, wherein the desired signals E are the noise signals or the pilot sequence.

5. The method according to claim 4, wherein superposing to-be-transmitted signals X on cancellation signals $\Delta X$ to obtain desired signals E comprises:
    when the to-be-transmitted signals X are directly replaced with the desired signals E and the desired signals E must be superposed on the cancellation signals $\Delta X$, controlling, by the canceller, the backhauled cancellation signals $\Delta X$ to be equal to 0 or less than E/10; or
    performing calculation according to the desired signals E and the to-be-transmitted signals X to obtain the cancellation signals $\Delta X$, wherein $\Delta X = E - X$, and superposing the cancellation signals on the to-be-transmitted signals X to obtain the desired signals E, wherein finally transmitted signals are $$\tilde{X} = X + \Delta X = X + E - X = E.$$

6. The method according to claim 1, wherein extending the crosstalk coefficients to other non-training tones to obtain crosstalk coefficients of all the tones comprises:
    directly extending the crosstalk coefficients of the training tones to tones in preset intervals; or
    performing an interpolation operation on crosstalk coefficients of multiple training tones, and estimating crosstalk coefficients of other tones.

7. The method according to claim 1, wherein the training tones are a part or all of probe tones.

8. The method according to claim 1, wherein performing initialization on the legacy line when the legacy line accesses the Vectored line for the first time comprises:
    establishing a handshake relationship between the legacy line and the Vectored line;
    modulating the pilot sequence on the legacy line and acquiring the clipped errors on the Vectored line, and calculating the coefficients of the crosstalk from the legacy line to the Vectored line; and
    performing a subsequent initialization operation and data transmission according to the acquired crosstalk coefficients.

9. An apparatus for compatibility with a second generation very-high-bit-rate digital subscriber loop (VDSL2) legacy customer premises equipment, the apparatus comprising:
    a vectoring control entity, configured to select tones in preset locations from tones of a legacy line as training tones, and calculate coefficients, for the training tones, of crosstalk of the legacy line in a Vectored line according to a pilot sequence modulated on the training tones and clipped errors fed back by a vectored customer premises equipment; and
    a transceiver, configured to control the training tones not to transmit data and modulate the pilot sequence on the training tones.

10. The apparatus according to claim 9, wherein the vectoring control entity is further configured to extend the crosstalk coefficients to other non-training tones to obtain crosstalk coefficients of all the tones.

11. The apparatus according to claim 9, wherein when controlling the training tones not to transmit data, the transceiver is further configured to:
    modulate noise signals on the training tones; or
    configure virtual noise on the training tones; or
    configure tone blackouts on the training tones; or
    skip transmitting signals on the training tones during signal-to-noise ratio measurement.

12. The apparatus according to claim 9, further comprising a canceller configured to backhaul cancellation signals $\Delta X$ to the transceiver, and when modulating the noise signals or the pilot sequence, the transceiver is further configured to:

directly replace to-be-transmitted signals X with desired signals E and control the desired signals E not to be superposed on the cancellation signals ΔX backhauled by the canceller; or superpose to-be-transmitted signals X on the cancellation signals ΔX to obtain desired signals E, wherein the desired signals E are the noise signals or the pilot sequence.

13. The apparatus according to claim 12, wherein when the to-be-transmitted signals X are superposed on the cancellation signals ΔX to obtain the desired signals E, the canceller is further configured to:

when the to-be-transmitted signals X are directly replaced with the desired signals E and the desired signals E must be superposed on the cancellation signals ΔX, control the backhauled cancellation signals ΔX to be equal to 0 or less than E/10; or perform calculation according to the desired signals E and the to-be-transmitted signals X to obtain the cancellation signals ΔX, wherein ΔX=E−X, and superpose the cancellation signals on the to-be-transmitted signals X to obtain the desired signals E, wherein finally transmitted signals are $$\tilde{X}=X+\Delta X=X+E-X=E.$$

14. The apparatus according to claim 10, wherein when extending the crosstalk coefficients to other non-training tones to obtain the crosstalk coefficients of all the tones, the vectoring control entity is further configured to:

directly extend the crosstalk coefficients of the training tones to tones in preset intervals; or perform an interpolation operation on crosstalk coefficients of multiple training tones, and estimate crosstalk coefficients of other tones.

15. The apparatus according to claim 9, wherein when the legacy line accesses the Vectored line for the first time and initialization is performed on the legacy line:

the transceiver is further configured to establish a handshake relationship between the legacy line and the Vectored line; and the vectoring control entity is further configured to modulate the pilot sequence on the legacy line, receive the clipped errors fed back by the vectored customer premises equipment, calculate the coefficients of the crosstalk from the legacy line to the Vectored line, and perform a subsequent initialization operation and data transmission according to the acquired crosstalk coefficients.

16. A system for compatibility with a second generation very-high-bit-rate digital subscriber loop (VDSL2) legacy customer premises equipment, the system comprising:

a central office, a vectored customer premises equipment, a legacy customer premises equipment, at least one legacy line used to connect the central office and the legacy customer premises equipment, and at least one Vectored line used to connect the central office and the vectored customer premises equipment;

wherein the central office is configured to select tones in preset locations from tones of the legacy line as training tones, control the training tones not to transmit data and modulate a pilot sequence on the training tones, and calculate coefficients, for the training tones, of crosstalk of the legacy line in the Vectored line according to the pilot sequence and clipped errors fed back by the vectored customer premises equipment; and wherein the vectored customer premises equipment is configured to calculate and feed back the clipped errors on the Vectored line.

17. The system according to claim 16, wherein the central office is further configured to extend the crosstalk coefficients to other non-training tones to obtain crosstalk coefficients of all the tones.

18. The system according to claim 16 wherein when controlling the training tones not to transmit data, the central office is further configured to:

modulate noise signals on the training tones; or configure virtual noise on the training tones; or configure tone blackouts on the training tones; or skip transmitting signals on the training tones during signal-to-noise ratio measurement.

19. The system according to claim 16, wherein the system further comprises a canceller configured to backhaul cancellation signals ΔX to the central office, and when modulating the noise signals or the pilot sequence, the central office is further configured to:

directly replace to-be-transmitted signals X with desired signals E and control the desired signals E not to be superposed on the cancellation signals ΔX backhauled by the canceller; or superpose to-be-transmitted signals X on the cancellation signals ΔX to obtain desired signals E, wherein the desired signals E are the noise signals or the pilot sequence.

20. The system according to claim 19, wherein when the to-be-transmitted signals X are superposed on the cancellation signals ΔX to obtain the desired signals E, the canceller is further configured to:

when the to-be-transmitted signals X are directly replaced with the desired signals E and the desired signals E must be superposed on the cancellation signals ΔX, control the backhauled cancellation signals ΔX to be equal to 0 or less than E/10; or perform calculation according to the desired signals E and the to-be-transmitted signals X to obtain the cancellation signals ΔX, wherein ΔX=E−X, and superpose the cancellation signals on the to-be-transmitted signals X to obtain the desired signals E, wherein finally transmitted signals are $$\tilde{X}=X+\Delta X=X+E-X=E.$$

* * * * *